May 8, 1928.

F. C. PEARSON

HYDRAULIC BRAKE

Filed June 13, 1925

1,668,730

Inventor
Frank C. Pearson

By Spencer, Sewall & Hardman
his Attorneys

Patented May 8, 1928.

1,668,730

UNITED STATES PATENT OFFICE.

FRANK C. PEARSON, OF DAYTON, OHIO, ASSIGNOR TO GENERAL MOTORS RESEARCH CORPORATION, OF DAYTON, OHIO, A CORPORATION OF DELAWARE.

HYDRAULIC BRAKE.

Application filed June 13, 1925. Serial No. 36,946.

This invention relates to fluid pressure operated plungers, especially such as are adaptable to operate the wheel brakes in a hydraulic brake system for vehicles.

It is old in hydraulic brakes to use two opposed working plungers reciprocable in a stationary cylinder to expand the brake shoes against the brake drum. The invention contemplates an improvement in such devices by providing an automatic slack adjustment of the plungers whereby the closing movement of the plungers is limited to the desired travel to give proper clearance between the brake shoes and drums.

In such devices, the brake linings or shoes wear down slowly with their continued use and this of course requires a further expansion of the plungers to properly tighten the brake shoes against the drum. If the plungers return all the way to their original closed position after each brake application an additional volume of oil will be required to fully expand the plungers on account of their additional movement to take up the slack due to wear of linings. This means then that there will be a certain amount of lag in applying the brakes.

This invention overcomes this objectionable lag by limiting the return or closing movement of the plungers at all times to a predetermined maximum so that when the brake linings wear down to closing movement of the plunger is always just sufficient to properly clear the brake shoes and drums.

A special object of the invention is to provide such an automatic slack adjusting means for the plungers which is simple in construction yet very reliable and efficient in use.

Further objects and advantages of the present invention will be apparent from the following description, reference being had to the accompanying drawings, wherein a preferred form of embodiment of the invention is clearly shown.

In the drawings.

Similar reference characters refer to similar parts throughout the several views.

Figure 1:
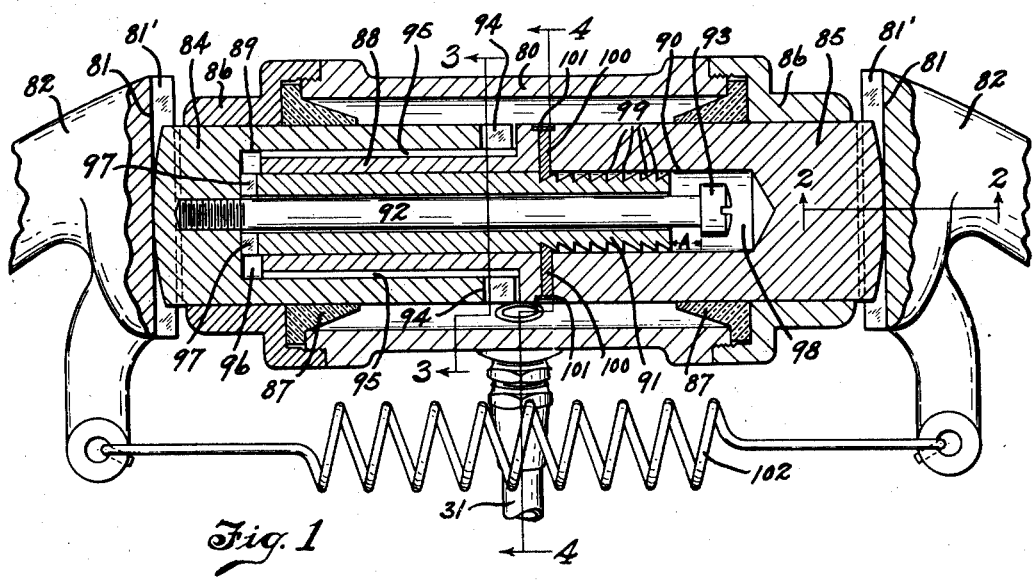
Fig. 1 is a section through a hydraulic brake operating cylinder built according to this invention.

The cylinder 80 is stationary and is suitably mounted directly between the opposed pressure faces 81 of the two internal brake shoes 82 which are pivotally mounted within the brake drum in a manner well known in the art. The two brake plungers 84 and 85 extend through the opposite cylinder heads 86 which are threaded upon the cylinder 80. A suitable sleeve packing 87 for preventing leakage of oil past the plungers is provided at each end and is held in place by having a flange thereon clamped between the cylinder 80 and the cylinder heads 86. This flange therefore thus serves as a gasket for the heads 86. This packing 87 is preferably of only slightly yieldable material and may be made of quite hard rubber. However, a material well known under the trade name of "micarta" is preferred for these packings 87.

The plunger 85 is provided with an extension 88 of reduced diameter which telescopes within a corresponding bore 89 in plunger 84. The plunger 85 is also provided with a central bore 90 in which is slidably fitted a tubular ratchet member 91. A long screw 92 having an enlarged head 93 extends quite loosely through ratchet member 91 and is threaded into plunger 84. The distance "A" between the screw head 93 and the end of ratchet member 91 limits the relative sliding movement between the plunger 84 and ratchet member 91, as is clearly shown in Fig. 1.

Figures 2, 3:
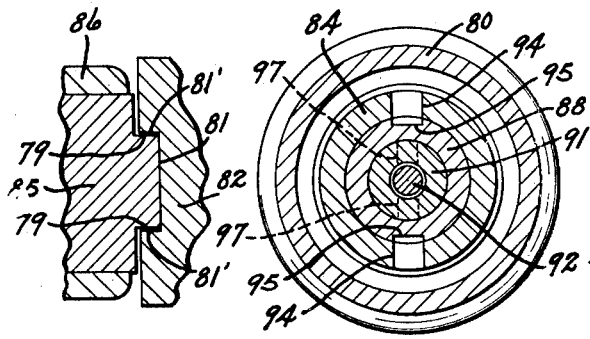
Fig. 2 is a horizontal section on line 2—2 of Fig. 1.
Fig. 3 is a vertical section on line 3—3 of Fig. 1.
Figure 4:
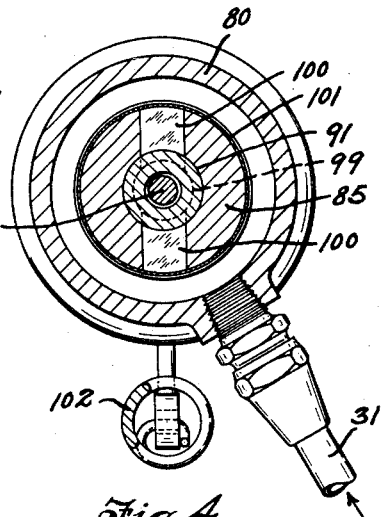
Fig. 4 is a vertical section on line 4—4 of Fig. 1.
Figure 5:
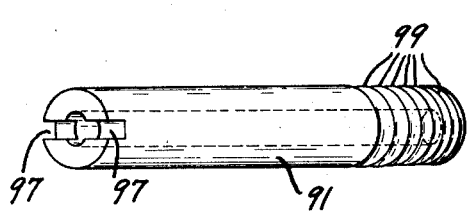
Fig. 5 is a perspective view of the cylindrical ratchet member.

In applying the brakes, oil enters the cylinder 80 through the high pressure duct 31 and is forced in between the plungers 84 and 85 at the recesses 94 and thence along longitudinal grooves 95 on the surface of the extension 88 into the annular space 96. From space 96 the oil passes through suitable notches 97 cut in the end of tubular ratchet member 91, and thence around the loosely fitting screw 92 to the cylindrical space 98. It will now be obvious that the oil pressure acts upon the total cross sectional area of the two plungers 84 and 85 and will force them apart, thus expanding the brake shoes 82 against the brake drums. The projecting ends of plungers 84 and 85 are cut away at each side thereof to form the vertical flats 79 thereon (see Fig. 2). These flatted sides 79 of the plungers 84 and 85 cooperate with the side flanges 81' on each side of the pressure faces 81 of the brake shoes 82 to prevent any rotation of said plungers within the stationary brake cylinder 80. Since both plungers are thus held against rotation the oil passages 94 in plunger 85 will remain at all times in register with the oil passage grooves 95 in plunger 84. Furthermore, the cooperation of plungers 84 and 85 with the side flanges 81' of the brake shoes 82 will hold the brake shoes accurately centered with the plungers at all times and hence there can be no tendency of the brake shoes to cock laterally due to an eccentric thrust of the plungers thereupon.

Fig. 1 shows the plungers in non-expanded position. After the plungers have been forced apart the distance "A" the screw head 93 will engage the end of ratchet member 91. This travel "A" is made only sufficiently great to permit the required movement of the brake shoes 82 for their proper braking and loose positions. Now when the brake linings wear down, the brake shoes 82 obviously must move out slightly further in order to apply the brakes, and in such event the screw head 93 will engage and move the ratchet member 91 such additional movement required by the amount of wear which has taken place. This ratchet member 91 is provided with a series of circular ratchet teeth 99 with which the two ratchet pawls 100 engage. These pawls 100 are held yieldably pressed down in suitable radial slots in plunger 85 by means of the circular spring band 101 which lies in a suitable annular groove on the periphery of plunger 85. Now when ratchet member 91 is moved by the screw head 93 a distance equal to that between two of the ratchet teeth 99 the pawls 100 will snap into the next succeeding notch. Then when the brakes are loosened by the operator the plungers 84 and 85 are returned to their closed position by the spring 102, as will be readily understood by those skilled in the art, but they will not telescope upon one another quite so far as before since the ratchet stop member 91 will be held by the pawls 100 in its new position one notch further to the left (as viewed in Fig. 1). Therefore when the brakes are next applied the plungers will not have so far to move before the brakes are tightened and hence the brakes may be applied more suddenly since less oil is required at each brake cylinder before the brake shoes are tightened upon the brake drums. Preferably a sufficient number of ratchet teeth 99 are provided on ratchet member 91 to take up the slack due to wearing down of the brake linings until the linings are worn out and require replacement. At the time of such replacement the ratchet member 91 should be set back in the position shown in Fig. 1 in which the pawls 100 engage in the first ratchet notch.

While the form of embodiment of the present invention as herein disclosed, constitutes a preferred form, it is to be understood that other forms might be adopted, all coming within the scope of the claims which follow.

What is claimed is as follows:

1. In a hydraulic brake, in combination, a pair of opposed brake shoes, a hydraulic brake cylinder having two opposed plungers for operating said brake shoes, said plungers telescoping one upon the other as they move from expanded to closed position, and an automatic slack adjusting mechanism located interiorly of said plungers for limiting the closing movement of said plungers to a predetermined maximum.

2. In a hydraulic brake, in combination, a pair of opposed brake shoes, a hydraulic brake cylinder having two opposed plungers for operating said brake shoes, said plungers telescoping one upon the other as they move from expanded to closed position, and a pawl and ratchet mechanism for limiting the closing movement of said plungers to a predetermined maximum distance but permitting an expanding movement of said plungers greater than said predetermined distance.

3. In a hydraulic brake, in combination, a pair of opposed brake shoes, a hydraulic brake cylinder having two opposed plungers for operating said brake shoes, said plungers telescoping one upon the other as they move from expanded to closed position, a stop member located interiorly of said plungers for limiting the closing movement of said plungers to a predetermined maximum, said stop member having a pawl and ratchet connection with a certain one of said plungers which permits the adjustment of said stop member relative to said certain plunger.

4. In a hydraulic brake, in combination, a pair of opposed brake shoes, a hydraulic brake cylinder having two opposed plungers for operating said brake shoes, said plungers telescoping one upon the other as they move from expanded to closed position, a stop member located interiorly of said plungers for limiting the closing movement of said plungers to a predetermined maximum, said stop member having a pawl and ratchet connection with a certain one of said plungers which permits the adjustment of said stop member relative to said certain plungers, and means associated with the other plunger for automatically adjusting said stop member to a new position when said plungers are expanded beyond a predetermined amount.

5. In a hydraulic brake, in combination, a pair of opposed brake shoes, a hydraulic brake cylinder having two opposed plungers for operating said brake shoes, said plungers telescoping one upon the other as they move from expanded to closed position, a stop member located interiorly of said plungers for limiting the closing movement of said plungers to a predetermined maximum, said stop member having a pawl and ratchet connection with a certain one of said plungers which permits the adjustment of said stop member relative to said certain plunger, and means fixed to the other plunger for moving said stop member to a new position when said plungers are expanded beyond a predetermined amount.

6. A fluid pressure cylinder having two opposed working plungers projecting from opposite ends thereof, said plungers being relatively expanded by fluid pressure therebetween, an adjustable stop member located interiorly of said plungers for limiting the relative closing movement of said plungers to a predetermined maximum, and means for automatically adjusting said stop member outwardly when said plungers are relatively expanded beyond a predetermined amount whereby said plungers are positively prevented from closing to their prior relative position.

7. A fluid pressure cylinder having two opposed working plungers projectable therefrom by the fluid pressure within said cylinder, a single pawl and ratchet mechanism within said cylinder which permits unlimited outward movement of said plungers but limits the inward movement of said plungers to a predetermined maximum.

8. In mechanism of the class described, a cylinder, a piston having a stop slidable therein, a one-way clutch cooperating with said piston and stop, means for admitting fluid to move the piston outwardly, and means for slipping the clutch by movement of the piston in excess of predetermined amount of travel.

9. In a brake, opposed brake members, telescopically arranged plungers for actuating said brake members, and means housed within said plungers for automatically limiting the release movement of said brake members to compensate for wear.

10. In a brake, opposed brake members, axially aligned plungers for actuating said brake members, and automatically adjustable means positioned co-axially of and between said plungers to limit the release movement of said brake.

11. In a brake, opposed brake members, axially aligned plungers for applying said brake members, a ratchet member slidable within one of said plungers, a pawl carried by one of said plungers for engagement with said ratchet, means carried by the other of said plungers to limit the movement of said ratchet with said first mentioned plunger.

12. In a brake, plungers movable axially away from each other to apply said brake, a ratchet slidably mounted relative to one plunger, means carried by said plunger engaging said ratchet to prevent the relative movement of said plunger and said ratchet in one direction, and means carried by the other of said plungers to limit the movement of the ratchet with the first plunger to thereby cause the actuation of the ratchet engaging means.

13. In a brake, plungers movable axially in opposite directions to apply the brake, means having a pawl and ratchet relation with one of said plungers, means associated with the other of said plungers to control the pawl and ratchet means to take up slack in the said brake.

14. In a brake, plungers movable axially away from each other to apply the brake, means slidable in one direction only relatively to one of said plungers, means carried by the other of said plungers to effect said relative sliding movement of said means after a predetermined movement of said means with said first member.

15. In a brake, plungers movable axially away from each other to apply the brake, means to return said plungers toward each other to release said brake, stop mechanism comprising parts carried by each of said plungers, the part carried by one plunger co-operating with the part carried by the other plunger to limit the return movement of said plungers at predetermined positions dependent upon the extent of movement of separation of said plungers.

In testimony whereof I hereto affix my signature.

FRANK C. PEARSON.